UNITED STATES PATENT OFFICE.

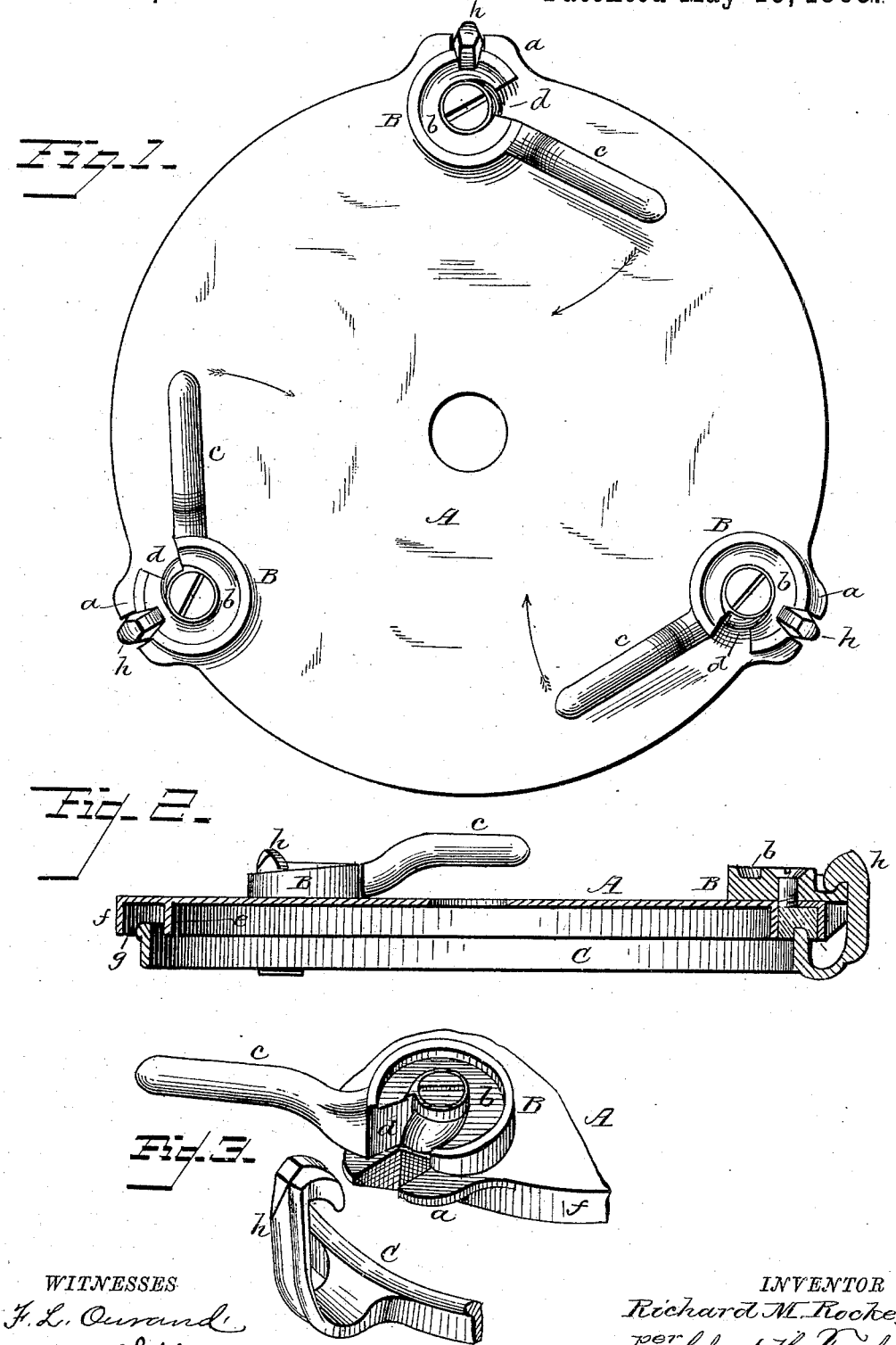

RICHARD M. ROCKEY, OF NORA, ILLINOIS.

TOP FOR MILK-CANS.

SPECIFICATION forming part of Letters Patent No. 277,613, dated May 15, 1883.

Application filed February 8, 1883. (Model.)

*To all whom it may concern:*

Be it known that I, RICHARD M. ROCKEY, a citizen of the United States, residing at Nora, in the county of Jo Daviess and State of Illinois, have invented certain new and useful Improvements in Tops for Milk-Cans and other Vessels; and I do hereby declare that the following is a full, clear, and exact description of the same, reference being had to the annexed drawings, making a part of this specification, and to the letters and figures of reference marked thereon.

Figure 1 of the drawings is a top plan view of my invention; Fig. 2, a longitudinal vertical section, and Fig. 3 a detail view of the same.

This invention relates to certain new and useful improvements in tops for milk-cans and other vessels, the object thereof being to provide such a device as will be simple and inexpensive in its construction, and readily adapted to the ordinary vessels of this description to thoroughly exclude the air, dust, and other foreign substances, and at the same time prevent any leakage. These objects I attain by the construction substantially as shown in the drawings, and hereinafter more fully described and claimed.

In the accompanying drawings, A represents the cover of a milk-can or other vessel, having slotted ears $a$ extending outwardly from its rim. To this top, upon its upper face, on a line with the center of the slotted ears $a$, are pivoted horizontally-operated cams B, provided with grooves $b$, lever-arms $c$, and notches $d$, said top having upon its under face a rim, $e$, which, in conjunction with its outer rim, $f$, forms an annular groove, $g$, for the reception of suitable packing.

To the vessel is suitably connected a ring, C, having formed therewith upwardly-projecting hooked arms $h$, adapted to register with and enter the slots of the ears $a$ on the cover, this said ring C coming against the packing placed between the rims $ef$ to form a tight joint.

When the cover A is to be connected to the vessel the cams B are brought into the position shown in Fig. 3, with their notches $d$ registering with the slots in the ears $a$ of the cover, and the whole placed upon the ring C, the arms $h$ of said ring entering the slotted ears of said cover and notches of the cams. After this adjustment the cams are swung around in the direction of the arrows, the hooked end of the arms $h$ bearing in the grooves $b$ of the cams, thereby admitting of the cover being brought tightly down upon the ring of the vessel and prevented from slipping or lateral displacement; and these cams, being operated horizontally instead of vertically, are more certain in their action, and the grooves in said cams, forming a guide for the hooked ends of the arms upon the ring, increase their effectiveness.

It will be readily seen that a cover for milk-cans or other vessels constructed according to the foregoing description is not only neat in its appearance, but also readily operated to secure a tight joint, and from the simplicity of its several operating parts can be easily and quickly attached to or removed from the vessel, while at the same time it, having no intricate parts, can be thoroughly cleansed with but little trouble or exertion.

Having now fully described my invention, what I claim as new, and desire to secure by Letters Patent, is—

1. A cover for milk-cans or other vessels, having slotted ears extending outwardly from its rim and horizontally-operated grooved cams, in combination with a vessel provided with upwardly-extending hooked arms, substantially as and for the purpose set forth.

2. In a milk-can or other vessel, the ring C, provided with upwardly-projecting hooked arms $h$, in combination with the cover A, having outwardly-extended slotted ears and horizontally-operated grooved cams, substantially as and for the purpose specified.

3. In a top for milk-cans or other vessels, having slotted ears $a$, the cams B, pivoted on a line with the center of said ears, and provided with grooves $b$ to form bearings and guides for the upwardly-extended hooked arms $h$ of the ring C, substantially as shown and described.

4. A cover for milk-cans or other vessels, having slotted ears $a$ projecting from its outer rim, and a packing-groove, $g$, upon its under face, in combination with the pivoted horizontally-operating cams B and ring C, formed with upwardly-extending hooked arms $h$, substantially as and for the purpose specified.

In testimony that I claim the above I have hereunto subscribed my name in the presence of two witnesses.

RICHARD M. ROCKEY.

Witnesses:
ALPHONSE E. RICKER,
MYRON H. BURR.